(12) United States Patent
Wallace (10) Patent No.: US 10,627,857 B2
(45) Date of Patent: Apr. 21, 2020

(54) ELECTRONIC DEVICE WITH ROTATABLE AND TRANSLATIONAL DISPLAY UNIT

(71) Applicant: Lenovo (Singapore) Pte. Ltd., New Tech Park (SG)

(72) Inventor: Brian William Wallace, Wake Forest, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 15/340,135

(22) Filed: Nov. 1, 2016

(65) Prior Publication Data

US 2018/0120896 A1 May 3, 2018

(51) Int. Cl.
*G06F 1/16* (2006.01)

(52) U.S. Cl.
CPC ............ *G06F 1/1624* (2013.01); *G06F 1/162* (2013.01); *G06F 1/1616* (2013.01); *G06F 1/1643* (2013.01); *G06F 1/1681* (2013.01); *G06F 1/1683* (2013.01)

(58) Field of Classification Search
CPC .... G06F 1/1681; G06F 1/1616; G06F 1/1624; G06F 1/1679; G06F 1/1643; G06F 1/1683
See application file for complete search history.

(56) References Cited

U.S. PATENT DOCUMENTS

| | | | | |
|---|---|---|---|---|
| 5,262,759 A * | 11/1993 | Moriconi | | G06F 1/1616 361/679.29 |
| 5,670,969 A * | 9/1997 | Yamagami | | G06F 1/1645 345/3.1 |
| 9,164,541 B2 * | 10/2015 | Chen | | G06F 1/1622 |
| 2007/0206346 A1 * | 9/2007 | Okuley | | G06F 1/162 361/679.06 |
| 2008/0180892 A1 * | 7/2008 | Lai | | G06F 1/1681 361/679.09 |
| 2011/0122555 A1 * | 5/2011 | Yeh | | G06F 1/1616 361/679.01 |
| 2011/0194232 A1 * | 8/2011 | Saila | | G06F 1/1616 361/679.01 |
| 2013/0128441 A1 * | 5/2013 | Lee | | G06F 1/1616 361/679.09 |
| 2013/0241383 A1 * | 9/2013 | Hsu | | G06F 1/162 312/311 |
| 2013/0329351 A1 * | 12/2013 | Lin | | H05K 5/0239 361/679.27 |
| 2014/0185224 A1 * | 7/2014 | Chen | | G06F 1/1622 361/679.27 |
| 2014/0368986 A1 * | 12/2014 | Lin | | G06F 1/1681 361/679.27 |
| 2015/0124388 A1 * | 5/2015 | Shen | | G06F 1/1616 361/679.09 |

* cited by examiner

*Primary Examiner* — Daniel P Wicklund
*Assistant Examiner* — Christopher L Augustin
(74) *Attorney, Agent, or Firm* — The Small Patent Law Group LLC; Dean D. Small (57) ABSTRACT

An electronic device is provided. The device comprises a display unit, memory to store program instructions, a processor to execute the program instructions in connection with operating the electronic device, a base unit and a hinge mechanism connecting the display unit to the base unit. The display unit is translationally movable along the base unit between forward and rearward positions. The display unit is rotationally movable, through the hinge mechanism, between open and collapsed positions.

19 Claims, 7 Drawing Sheets

ELECTRONIC DEVICE WITH ROTATABLE AND TRANSLATIONAL DISPLAY UNIT

FIELD

Embodiments of the subject matter described herein relate to systems and methods of an electronic device with a rotatable and translational display unit.

BACKGROUND

Personal computers (PCs) and tablet devices have become fundamental tools both in personal life and business. The PC and tablet device are easy to operate and simple to carry. However, the PC and tablet device offer slightly different user experiences, which has led individuals to continue using both types of devices for different aspects of personal and business use. For example, the PC offers a larger user interface with a separate keyboard and display that facilitate extended, continuous use, while the tablet device offers a simpler user interface through a touchscreen. However, when the display on a conventional PC is closed, the device shuts down or enters a sleep mode.

On tablet devices, the touchscreen is easy to use while traveling and/or in public areas that do not afford a table or desk to hold a PC. Also, tablet devices facilitate joint viewing of a common display by a primary user and others (e.g., a customer, student, co-worker, family member, etc.). However, conventional tablet devices do not provide the same user interface experience as a conventional PC. For example, the touch screen is also utilized as the user interface for all modes of operation.

Convertible tablet personal computers (convertible PCs) have been proposed that offer the dual functionality of a PC and a tablet device. The convertible PC includes a display portion that is capable of rotating 360 degrees and folding back over the keyboard. However, convertible PCs also experience certain limitations. The convertible PC can be used in two ways, as a normal laptop personal computer (laptop PC) and a tablet PC. When such a convertible PC is changed to a tablet PC, the upward-facing keyboard in laptop PC mode becomes the downward-facing portion in tablet PC mode. Therefore, when the tablet PC is placed on a desk or other similar surface, the keyboard and click pad come into direct contact with the hard surface of the desk. Consequently, this decreases the stability of the device and also increases the likelihood of scratching or damaging the keyboard and click pad.

A need remains for improved methods and devices that overcome the disadvantages discussed above and other disadvantages in conventional systems that will become apparent herein.

BRIEF DESCRIPTION

In accordance with embodiments herein, an electronic device is provided. The device comprises a display unit, memory to store program instructions, a processor to execute the program instructions in connection with operating the electronic device, a base unit and a hinge mechanism connecting the display unit to the base unit. The display unit is translationally movable along the base unit between forward and rearward positions. The display unit is rotationally movable, through the hinge mechanism, between open and collapsed positions.

Optionally, the base unit may comprise a track that may extend along at least a portion of the base unit. The hinge mechanism may move within the track to enable the display unit to be translationally movable between the forward and rearward positions. The base unit may include an upper cover having a top surface. The track may be formed in the upper cover. The track may have a central gap that opens on to the top surface. The hinge mechanism may extend through the central gap. The track may include a channel structure. The hinge mechanism may include a guide segment that may be shaped to fit within the channel structure. The guide segment may slide along the track between the forward and rearward positions. The channel structure may include a channel arm and a channel leg that may extend along the track and the hinge mechanism a guide arm and a guide leg received within the channel arm and channel leg, respectively.

Optionally, the device may further comprise a conductive strip that may extend along the base unit. The conductive strip may be electrically coupled to a display driver within the base unit. The hinge mechanism may include a contact pad electrically connected to a display screen within the display unit. The contact pad may slide along the conductive strip when the display unit is translationally moved to maintain an electrical connection between the display screen and the display driver over a continuous range of positions of the hinge mechanism along the conductive strip. The device may further comprise conductive strips that may extend along the base unit and corresponding contact pads provided on the hinge mechanism. The conductive strips and corresponding contact pads may define a power channel and one or more data channels.

Optionally, the display unit may include a touch sensitive display. The collapsed position may include a storage position and a tablet position. The touch sensitive display may be closed against the base unit corresponding to the storage position. The touch sensitive display may be exposed and facing outward from the base unit corresponding to the tablet position. The base unit may include a keyboard. The base unit may have front and rear edges relative to the keyboard. The display unit may be positioned proximate to the rear edge behind the keyboard when the display unit is in the rearward position. The display unit may be positioned proximate to the front edge in front of the keyboard when the display unit is in the forward position.

In accordance with embodiments herein, an electronic device is provided. The electronic device may comprise a display unit, a base unit that includes a track extending along at least a portion of the base unit, the track including forward and rearward positions and a hinge mechanism provided within the track. The hinge mechanism translationally moves within the track between the forward and rearward positions. The hinge mechanism is rotatably mounted to the display unit such that the display unit is rotationally movable, through the hinge mechanism, between open and collapsed positions relative to the base unit. The display unit is translationally movable along the track, through the hinge mechanism, between the forward and rearward positions.

Optionally, the base unit may include a keyboard. The display unit may include a touch sensitive display. The display unit may be rotatable between a tablet position and a non-tablet position. The electronic device may further comprise a memory storing program instructions and a processor to execute the program instructions. The processor may activate and deactivate the touch sensitive display relative to the tablet position and the non-tablet position, respectively. A rear surface of the display unit may cover the keyboard when in the tablet position. The touch sensitive display of the display unit may cover the keyboard when in the non-tablet position. The track may include a channel structure having a central gap that is formed with multiple channel legs and multiple lateral channel arms. The central gap may open onto a top surface of an upper cover of the base unit. The channel legs may extend downward from the central gap into a body of the upper cover.

In accordance with embodiments herein, a method is provided. The method provides an electronic device with a display unit rotatably mounted to a base unit. The base unit includes a keyboard and having front and rear edges relative to the keyboard and rotatably mounts the display unit to the base unit. The method enables the display unit to move along a longitudinal direction in a linear path between first and second positions. The linear path at least partially crosses the keyboard.

Optionally, the display unit may be rotationally movable, through a hinge mechanism, between open and collapsed positions. The method may further comprise rotating the display unit open from a storage position, sliding the display unit along the linear path from the first position to the second position, rotating the display unit to a tablet position. The first position may correspond to the display unit located proximate to the rear edge of the base unit behind the keyboard. The second position may correspond to the display unit located proximate to the front edge of the base unit in front of the keyboard. The display unit may include a touch sensitive screen. The method may further comprise rotating the display unit from the open position to a collapsed position against the base unit such that the touch sensitive screen faces outward from the base unit and is exposed. The enabling may include defining the linear path by providing a track along the base unit. The display unit may translationally move along the linear path within the track.

BRIEF DESCRIPTION OF THE DRAWINGS

The subject matter described herein will be better understood from reading the following description of non-limiting embodiments, with reference to the attached drawings, wherein below.

DETAILED DESCRIPTION

It will be readily understood that the components of the embodiments as generally described and illustrated in the FIGS. herein, may be arranged and designed in a wide variety of different configurations in addition to the described example embodiments. Thus, the following more detailed description of the example embodiments, as represented in the FIGS., is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1A:
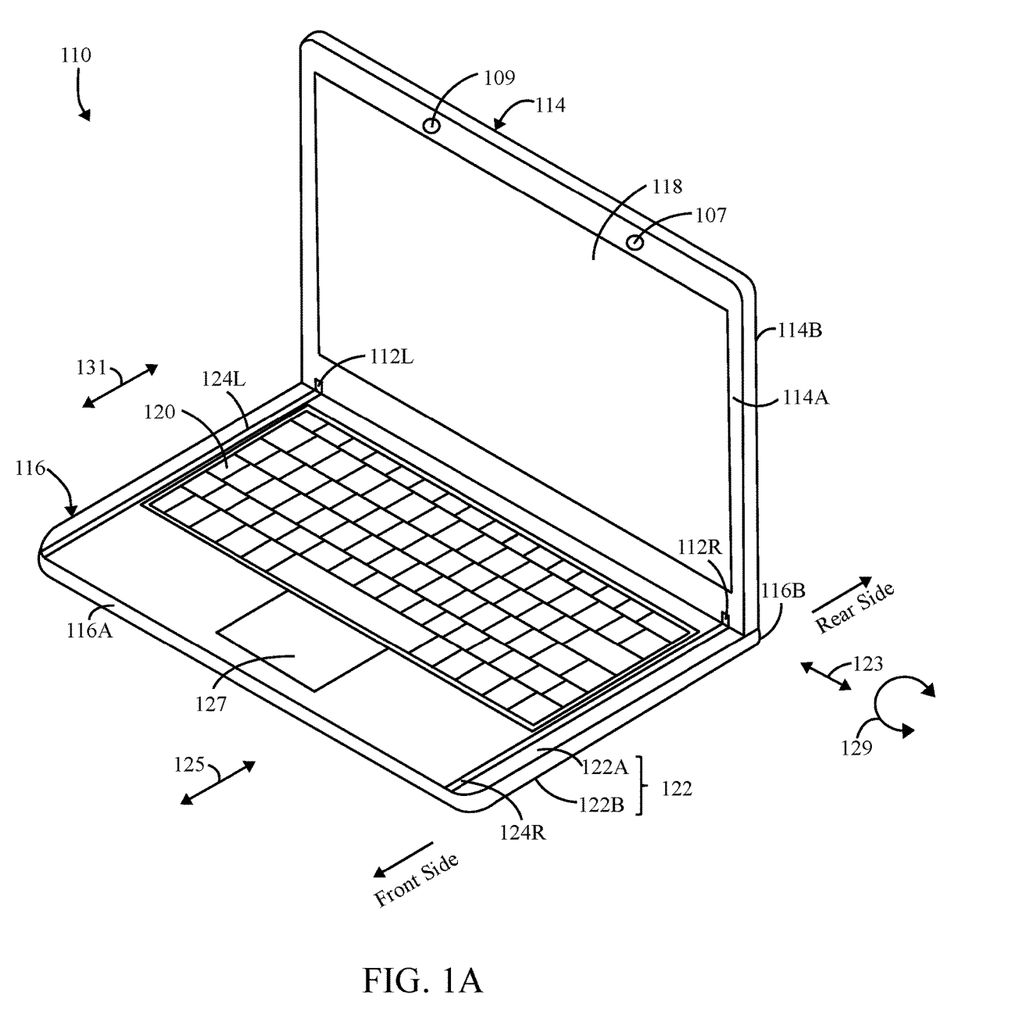
FIG. 1A is a perspective view of an electronic device formed in accordance with embodiments herein.

Throughout the present description, the terms "vertical", "horizontal", and "lateral" shall define directions with respect to the display and keyboard of the device. The term "lateral" shall refer to a direction extending transversely across the user input region (e.g., from left to right or from right to left, with respect to a keyboard). In the example of FIG. 1A, the lateral direction is illustrated by lateral axis 123 which extends through the hinges. The term "vertical" shall refer to a direction extending outward from the user input (e.g., keyboard) such as in a direction non-parallel to the lateral direction. In the example of FIG. 1A, the vertical direction illustrated by the vertical axis 128 is oriented perpendicular to the lateral axis 123, with the vertical axis extending upward along the display unit 114. The term "horizontal" shall refer to a direction that is perpendicular to the "vertical" direction. The term "longitudinal" shall define a direction with respect to the keyboard of the device. The term "longitudinal" shall refer to a direction extending perpendicular to the lateral axis 123 and extending between the front and rear of the base unit. The longitudinal direction is illustrated by longitudinal axis 125 in FIGS. 1A and 2D.

Throughout the present description, the terms "upper", "lower", "top", "bottom", "left", "right", "front", "forward", "rear", and "rearward" shall define directions or orientations with respect to the base unit. The front and rear sides of the base unit are depicted by the arrows labeled "front side" and "rear side" in FIG. 1A. It will be understood that the spatially relative terms "upper", "lower", "top", "bottom", "left", "right", "front", "forward", "rear", and "rearward" are intended to encompass different orientations of the electronic device in use or operation in addition to the orientation depicted in the FIGS.

FIG. 1A is a perspective view of an electronic device 110 formed according to an embodiment herein, showing a state where a display unit 114 is opened from a base unit 116. In the example of FIG. 1A, the display unit 114 and base unit 116 are opened to be approximately perpendicular to each other. The electronic device 110 can be suitably used as a laptop PC when the display unit 114 is at various angles relative to the base unit 116. Note that, in addition to such a convertible PC, embodiments herein can be suitably applied to electronic devices such as cellular phones, smart phones, and various electronic organizers.

As a point of reference, when a user is positioned to directly face the front face of the display unit 114 when in the position of FIG. 1A, the side closest to (and facing toward) the user is called the front side 114A (forward) and the side furthest away from (and facing away from) the user is called the rear side 114B (rearward). The thickness 115 of the base unit 116 is defined with respect to the vertical direction 128, while the width is defined with respect to the lateral direction 123. The display unit 114 contains a display screen 118. The display screen 118 may represent a touch sensitive screen. The display unit 114 also includes a camera 109 and a microphone 107.

The base unit 116 houses a keyboard 120, processor, memory as well as other components based on the nature and functionality to be provided. The keyboard 120 is positioned on the base unit 116. The base unit 116 includes upper and lower covers 122A, 122B that are joined with one another to form a housing and that may be formed of a plastic material or other suitable material. A mouse touch pad 127 may be built into the upper cover 122A. The upper cover 122A includes a rectangular opening that exposes the keyboard 120 and/or other user interface features. The upper cover 122A includes one or more tracks, illustrated as left and right tracks 124L, 124R. The left track 124L is provided on the upper cover 122A of the base unit 116 and located between the left edge (from a user's perspective) of the base unit 116 and left edge of the keyboard 120. The right track 124R is provided on the upper cover 122A of the base unit 116 and located between the right edge (from the user's perspective) of the base unit 116 and right edge of the keyboard 120. The tracks 124L, 124R extend between the front and rear edges 116A and 116B of the base unit 116. The tracks 124L, 124R may be integrally formed within the upper cover 122A, or mounted to a surface of the upper cover 122A. The right and left tracks 124R, 124L are constructed in a similar manner and thus, the description thereof will be provided with respect to one track generally referred to as track 124.

Figure 1B:
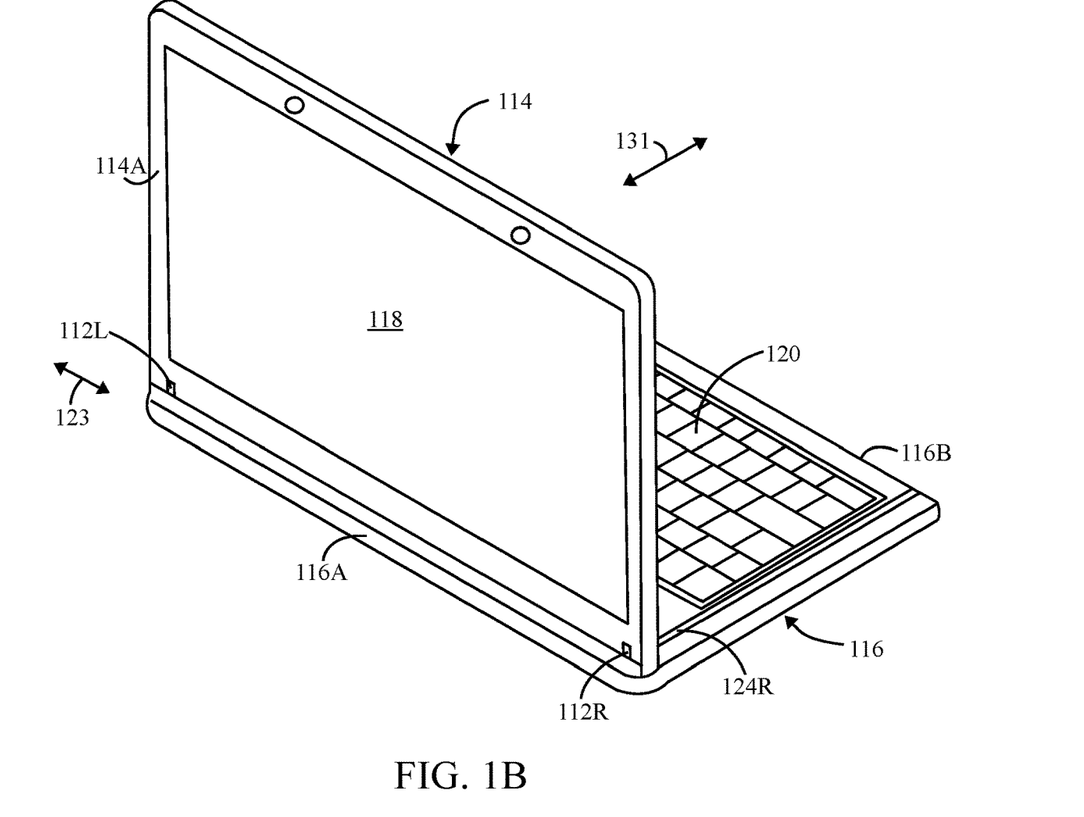
FIG. 1B illustrates a forward position of an electronic device formed in accordance with embodiments herein.
Figure 1C:
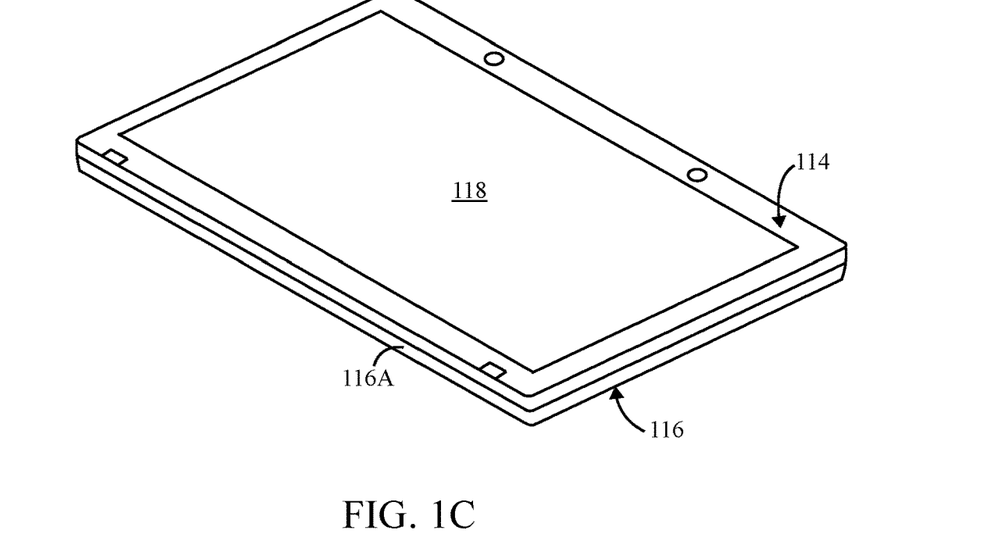
FIG. 1C illustrates a tablet position of an electronic device formed in accordance with embodiments herein.

The tracks 124R, 124L receive corresponding hinge mechanisms 112R, 112L that are coupled to the display unit 114. The hinge mechanisms 124R, 124L translationally move (e.g., slide, roll, etc.) within the corresponding tracks 124R, 124L along the base unit 116, thereby allowing the display unit 114 to be translated over a continuous range between the positions illustrated in FIGS. 1A and 1B, as well as any intermediate point there between. The position illustrated in FIG. 1A represents a rearward position, at which the display unit 114 is positioned "behind" the keyboard 120, such that the keyboard 120 is between (accessible by) a user and the display unit 114. The position illustrated in FIG. 1B represents a forward position, at which the display unit 114 is positioned "in front of" the keyboard 120, such that the display unit 114 is between the user and the keyboard 120. The position illustrated in FIG. 1C represents a tablet position, at which the display unit 114 is folded to cover the keyboard 120 while the display screen 118 faces upward. The tablet position of FIG. 1C may be of interest when the display screen 118 is touch sensitive.

The display unit 114 may be positioned in various non-tablet positions. By way of example, a non-tablet position may correspond to a closed or in operative position with the display screen 118 facing downward against the keyboard 120. As another example, a non-tablet position may correspond to various positions or ranges of positions, at which the display unit 114 is oriented within a predetermined range of a cute or obtuse angles relative to the base unit 116. For example, when the display unit 114 is oriented at a 90° angle (e.g., +/−20°) relative to the base unit 116, the processors of the electronic device 110 may disable the touch sensitive feature of the display screen 118. When the display unit 114 is oriented at an angle of zero to 70° relative to the base unit or at an angle of 110 to 180° relative to the base unit, the processors of electronic device 110 may enable the touch sensitive feature of the display screen 118. Is recognized that the foregoing angles are non-limiting examples of angles that may be used to determine when to switch between activating and deactivating the touch sensitive feature may be varied. Additionally or alternatively, the touch sensitive feature may be activated and deactivated based upon a position of the display unit 114 relative to the keyboard 120. For example, when the display screen 114 is slid along the tracks 124 to a position behind the keyboard 120, the touch sensitive feature may be deactivated. When the display screen is slid along the tracks 124 to a position in front of the keyboard 120, or to a position partially covering the keyboard 120, the touch sensitive feature may be activated. Optionally, the touch sensitive feature may remain on at all times or be activated and deactivated manually by a user through the user interface.

The hinge mechanisms 112R, 112L are constructed in a similar manner and thus, the description thereof will be provided with respect to one hinge mechanism generally referred to as hinge mechanism(s) 112. The hinge mechanisms 112 are configured to move within the track 124 to enable the display unit 114 to be translationally movable over a continuous range of positions between forward and rearward positions. The hinge mechanisms 112 enable the display unit 114 to be rotationally movable, relative to the base unit 116, between various open and collapsed positions. For example, the display unit 114 may be rotated from the position illustrated in FIG. 1A forward and downward to the closed position such that the display screen 118 closes against and faces the keyboard 120 (also referred to as a non-operative closed or storage position). As another example, the display unit 114 may be rotated from the position illustrated in FIG. 1B backward and downward to the position illustrated in FIG. 1C such that the display screen 118 faces upward away from the keyboard 120, while the rear side 114B of the display unit 114 covers the keyboard 120 (also referred to as a tablet position).

As explained herein, one or more power and one or more data channels are maintained through conductive paths that extend along the tracks 124 and through the hinge mechanisms 112. The data channels may convey various types of display content, operational information, command information, graphical information, and the like. The data channels connect the components in the display unit 114 and the components in the base unit 116. The data channels may include one or more bidirectional data channels that convey audio/video data from a camera and/or microphone that may be located in the display unit 114. The audio/video data is conveyed from the camera and/or microphone to a processor within the base unit 116. In connection with embodiments in which the display screen 118 is touch sensitive, the data channels may also be bidirectional to convey touch related data from the touch sensitive display screen 118 to a processor within the base unit 116.

FIGS. 1A to 2D illustrate the display unit 114 and base unit 116 translated and oriented with respect to one another to various open, collapsed and intermediate positions. Beginning with the position in FIG. 2A, the display unit 114 is folded to a closed position relative to the base unit 116 with the display screen facing the keyboard. In the examples of FIGS. 1A-2D, the display unit 114 may be moved along a linear path in (e.g., linearly shifted or slid along) a translational direction 131 along the longitudinal axis 125, and may be moved in (e.g., rotated about) a rotational direction 129 about the lateral axis 123. As the display unit 114 is shifted along the translational direction 131, the display unit 114 may be rotated in the lateral direction 129 even while the display 114 is positioned at any intermediate point along the track 124.

It may be desirable to align the display unit 114 near the front edge or at an intermediate point along the base unit while watching the video. For example, when traveling on an airplane, it may be convenient to position the display unit 114 at an intermediate point along the base unit 116 while watching movies and other video content.

Figure 2A:
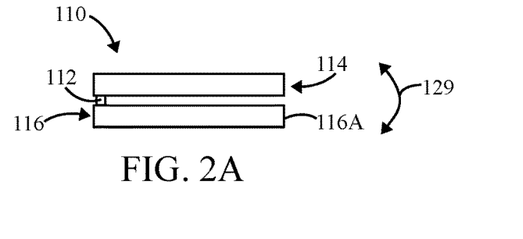
FIG. 2A illustrates a side view of an electronic device in the closed position in accordance with embodiments herein.
Figure 2B:
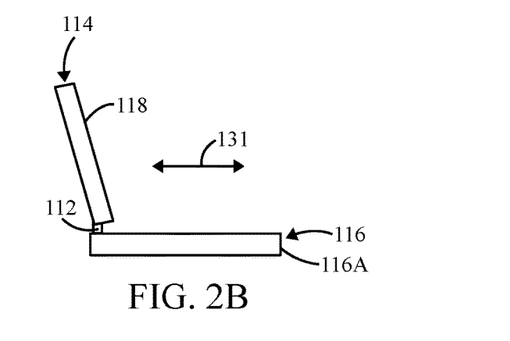
FIG. 2B illustrates a side view of an electronic device in the open position in accordance with embodiments herein.

The hinge mechanism 112 enables the display unit 114 to rotate from zero to 180° relative to the base unit 116. Alternatively, the hinge mechanisms 112 may be constructed to enable the display unit 114 to rotate 360° relative to the base unit 116. As shown in FIG. 1A, the base unit 116 is located at the rear edge 116B of the base unit 116 and the display unit 114 is rotated (approximately 90°) relative to the base unit 116 through the hinge mechanisms 112 about the lateral axis 123 to an open position. When in the open position, the front side 114A of the display unit 114 faces in the direction of the keyboard 120 and is visible to the user of the keyboard 120. From the position shown in FIG. 1A, the display unit 114 may be rotated toward the keyboard 120 (e.g., to a storage or closed position), such as shown in FIG. 2A. From the position shown in FIG. 1A, the display unit 114 may be rotated away from the keyboard 120, to an angle greater than 90° (e.g., an obtuse angle or 180° planar position), such as shown in FIG. 2B. Moreover, as explained herein in connection with various embodiments, the display unit 114 may be rotated beyond 180° relative to the keyboard 120 until being folded behind the keyboard such that the keyboard 120 and display screen 118 face in opposite directions.

Figure 2C:
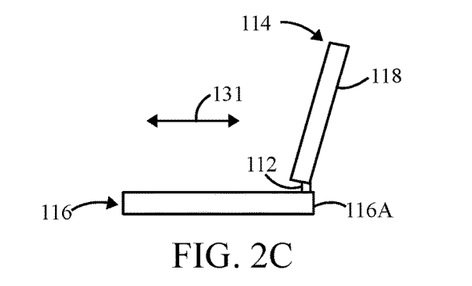
FIG. 2C illustrates a side view of an electronic device in the forward position in accordance with embodiments herein.
Figure 2D:
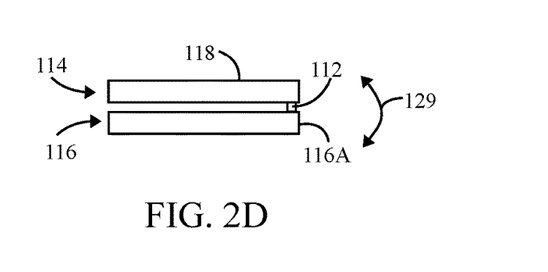
FIG. 2D illustrates a side view of an electronic device in the tablet position in accordance with embodiments herein.

As illustrated in FIGS. 1C, 2A, and 2D, the display unit 114 is closed to the base unit 116 at a low angle, such as a 0-degree angle position, between the base unit 116 and the display unit 114 by the hinge mechanisms 112 in a collapsed position. The collapsed position may include a storage position (FIG. 2A) and a tablet position (FIGS. 1C and 2D). In the storage position, the touch sensitive screen 118 is closed against the keyboard 120 such that the touch sensitive screen 118 and the keyboard 120 face each other as illustrated in FIG. 2A. In the tablet position, the electronic device 110 can be used in a tablet mode. In the tablet position, the rear side 114B of the display unit 114 is closed against the keyboard 120 such that the touch sensitive screen 118 is exposed and faces outwardly away from the keyboard 120 as illustrated in FIGS. 1C and 2D. In the alternative arrangement where the display unit 114 may rotate 360°, the tablet mode may be used when the back side 114B of the display unit 114 is closed against the bottom side of the base unit 116 such that the touch sensitive screen 118 is exposed and faces outwardly away from the base unit 116. Also, in the tablet position, the display unit 114 may be slightly raised from the flat position, so that the electronic device 110 can be used as a stand type tablet PC with the base unit 116 as the base.

The electronic device 110 can be used as a laptop PC in the open position when the display unit 114 is angled at any non-zero angle relative to the base unit 116 (see FIG. 1A and FIG. 2B). The display unit 114 may rotate upwardly and away from the keyboard 120 in the direction of arrow A (FIG. 2B) to go from the closed position (FIG. 2A) to the open position illustrated in FIG. 2B. The display unit 114 may translationally move along a longitudinal direction 131 in a linear path as the hinge mechanisms 112 slides along the tracks 124 between a forward position and a rearward position. For example, the display unit 114 may move forward in the direction of arrow D of FIG. 2C from the rear position to the forward position. In the forward position, the display unit 114 is in front of the keyboard 120 near the front edge of the base unit 116 as illustrated in FIGS. 1B and 2C. In the rearward position, the display unit 114 is located rearwardly from (or behind) the keyboard 120 near the rear edge 116B of the base unit 116 as illustrated in FIGS. 1A and 2B. The display unit 114 may also be moved to further selected positions along the tracks 124. By way of example, a predetermined amount of friction may be maintained between the tracks 124 and the hinge mechanisms 112 to maintain the display unit 114 at a select translational position (along a continuous range of positions) within the tracks 124 until a sufficient force is applied (e.g., by a user) to overcome the predetermined amount of friction. When the predetermined amount of friction is applied, the display unit 114 (through the hinge mechanisms 112) slides along the tracks 124. Alternatively, a locking mechanism may be provided to lock the display unit 114 at the selected position. When the display unit 114 is at the forward position, the display unit 114 may be rotated downwardly toward the keyboard 120 in the direction of arrow T to the tablet position as illustrated in FIG. 2D.

The display unit 114 crosses over a top of the keyboard 120 when moving along the linear path. The display unit 114 may be located at various positions along a continuous range of positions in front of, behind and above the keyboard 120. As one example of a range of motion, the display unit 114 may be rotated open from a storage position, slid along the linear path from a first position to a second position and rotated to a tablet position. The foregoing example of movements may occur in any order. For example, the display unit 114 may be slid along the linear path between forward and rearward positions (or any intermediate position there between), first or last. Before or after sliding the display unit 114 along a linear path, the display unit 114 may be rotated between the storage position, the tablet position and any intermediate position there between. The movement of the display unit 114 along a linear path and the rotational the display unit may be intermittently performed and/or simultaneously performed.

Figure 2E:
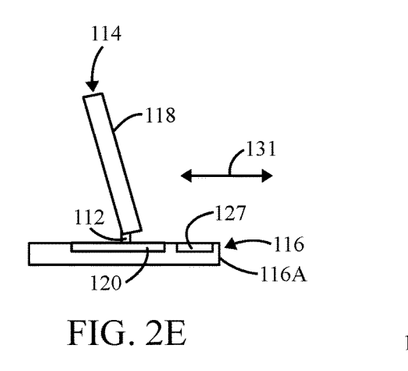
FIG. 2E illustrates a side view of an electronic device positioned in accordance with an embodiment herein.

FIG. 2E illustrates the electronic device 110 position in accordance with an embodiment herein. The display unit 114 is slid to an intermediate position along the base unit 116 and located above the keyboard. By way of example, the position in FIG. 2E may be of interest when viewing a presentation, watching videos, playing games, operating the electronic device 110 in a tablet mode and the like. The position in FIG. 2E may also be of interest when viewing the display unit 114 in a constrained space, such as while sitting in a vehicle, riding on an airplane, commuting on public transportation, working in a public area with limited table space and the like. The display unit 114 is located to fully or partially cover the keyboard 120, while leaving the mouse touchpad 127 uncovered and exposed. For example, the touchpad 127 may be utilized, alone or in combination with a touch sensitive display, as a user input when the display unit 114 is located to fully or partially cover the keyboard 120.

Figure 2F:
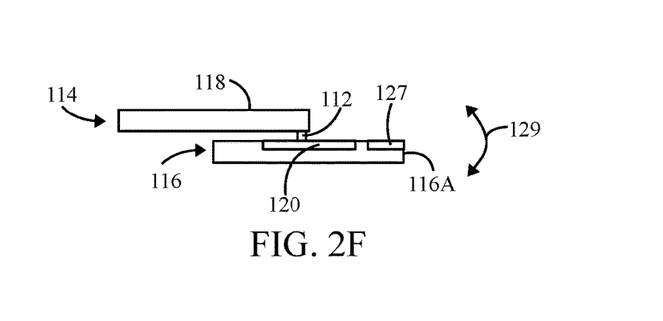
FIG. 2F illustrates a side view of an electronic device positioned in accordance with an embodiment herein.

FIG. 2F illustrates the electronic device 110 positioned in accordance with an embodiment herein. The display unit 114 is folded downward to a position substantially parallel (e.g., oriented at 180° angle relative) to the base unit 116, and with the display screen 118 exposed and facing upward. The display unit 114 is located to fully or partially cover the keyboard 120, while leaving the mouse touchpad 127 uncovered and exposed. For example, the touchpad 127 may be utilized, alone or in combination with a touch sensitive display, as a user input when the display unit 114 is located to fully or partially cover the keyboard 120.

Next, the discussion will turn to a description of example embodiments for the tracks 124 and hinge mechanisms 112.

Figure 3A:
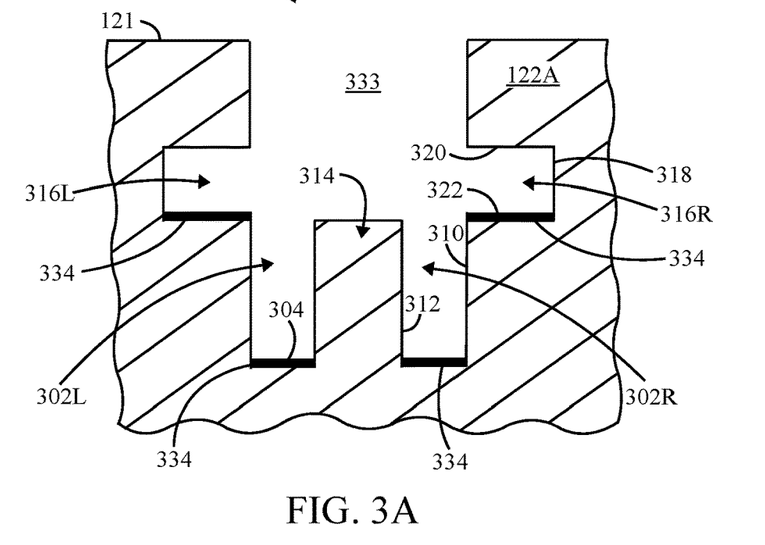
FIG. 3A illustrates an end sectional view taken through a portion of the upper cover proximate to one of the tracks in accordance with embodiments herein.

FIG. 3A illustrates an end sectional view taken through a portion of the upper cover 122A proximate to one of the tracks 124. The track 124 is formed with (and defines) a channel structure 300 that extends along a length of the track 124 between the front and rear edges 116A, 116B. In the present example, the track 124 extends in a directional parallel to the longitudinal axis 125, although the track 124 may be formed to extend in alternative directions. The channel structure 300 includes a central gap 333 that is formed with multiple channel legs 302R, 302L, and lateral channel arms 316R, 316L. In the present example, two channel legs and two channel arms are illustrated, although it is understood that various numbers of channel arms and channel legs may be utilized. Is also recognized that the channel legs may be removed entirely and/or the channel arms may be removed entirely. The central gap 333 opens onto a top surface 121 of the upper cover 122A, while the channel legs 302R, 302L extend downward from the central gap 333 into the body of the upper cover 122A. As explained herein, the hinge mechanisms 112 include a lower portion that fits within the channel structures 300 and includes an upper portion that extends through the central gap 333 above the top surface 121 to be coupled to the display unit 114. The channel legs 302R, 302L have bottom walls 304 that join opposite side walls 310, 312. In the present example, the bottom walls 304 extend horizontally, while the sidewalls 310, 312 extend vertically, although alternative orientations may be utilized. The channel legs 302R, 302L are separated from one another by an intermediate wall 314 that extends upward toward the central gap 333. The lateral channel arms 316R, 316L extend in opposite lateral directions from the central gap 333. The lateral channel arms 316R, 316L may be oriented to extend parallel, or at non-parallel angles, relative to the top surface 121 of the upper cover 122A. The lateral channel arms 316L, 316R are defined by an outer side wall 318 that joins top and bottom walls 320, 322. By way of example, the top and bottom walls 320, 322 may extend parallel to the top surface 121 of the upper cover 122A. Alternatively, the top and bottom walls 320, 322 may extend at an acute or obtuse angle relate to the surface 121 of the upper cover 122A.

Conductive strips 334 are mounted on one or more of the sides and/or walls 304, 310, 312, 318, 320, 322 within the channel structure 300. The conductive strips 334 are connected to electrical wires that extend internal to the base unit 116 to be joined with corresponding electrical components, such as a display driver, camera driver, microphone electronics and the like. For example, the conductive strips 334 may be mounted on the bottom walls 322 of one or both lateral channel arms 316R, 316L. Additionally or alternatively, the conductive strips 334 may be mounted on the outer walls 304 of one or both the channel legs 302R, 302L. In the present example, a single conductive strip 334 is mounted in each of the channel arms and legs 316R, 316L, 302R, 302L. Optionally, more than one electrically separated and distinct conductive strip 334 may be provided in one or more of the channel arms and legs 316R, 316L, 302R, 302L. The conductive strips 334 are to convey various types of power and data between the electrical components within the display unit 114 and the electrical components within the base unit 116. For example, the conductive strips 334 may convey display content, graphical data, communications data, power, touch position information, video signals from a camera, audio signals from a microphone and the like. The number of conductive strips 334 may be based on the number of separate and distinct power and data channels that are supported and/or utilized by the display unit 114.

The conductive strips 334 may be joined to the channel structure 300 by any suitable fastening manner. For example, each conductive strip 334 may be adhesively mounted to the corresponding bottom wall/side by a thin adhesive layer or by fasteners such as screws. Alternatively, each conductive strip 334 may be snapped or pressed into slots formed in the corresponding wall/side. In another example, each conductive strip 334 may be co-extruded with the channel structure 300 at desired points. The conductive strips 334 have a width similar to or less than the width of a corresponding wall or side within the channel structure 300. The conductive strips 334 may be formed of conductive materials, such as copper, brass, aluminum, fiber optic medium, or other known conductive materials. The conductive strips 334 are oriented parallel to one another. The conductive strips 334 are electrically insulated from one another through the insulation properties of the material that defines the channel structure 300. The conductive strips 334 are illustrated with a flat cross section, but alternatively could have round, square or of other cross sectional shapes and sizes. The conductive strips 334 may extend a full length of the track 124, or alternatively along a select portion of the track 124. The conductive strips 334 are electrically coupled to electrical components in the base unit 116 that are used to electrically control or provide power to the display unit 114.

Figure 3B:
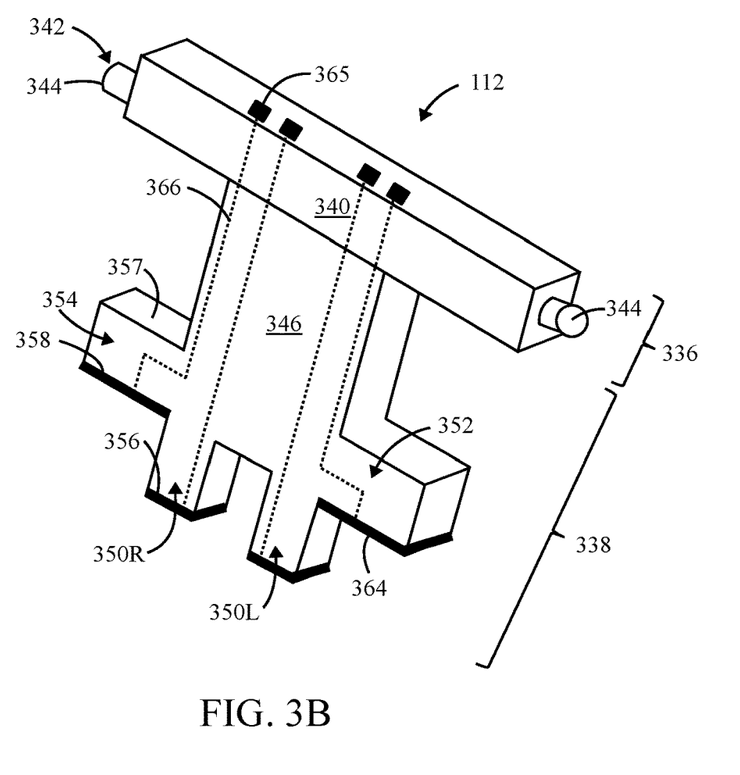
FIG. 3B illustrates a front perspective view of a hinge mechanism formed in accordance with an embodiment herein.

FIG. 3B illustrates a front perspective view of a hinge mechanism 112 formed in accordance with an embodiment herein. The hinge mechanism 112 is shaped and dimensioned to fit within the channel structure 300 (FIG. 3A) and to slide along the corresponding track 124. The hinge mechanisms 112 includes a hinge segment 336 and a guide segment 338 that may be formed in a monolithic manner with one another, or alternatively as separate pieces that are joined to one another in various manners. The hinge segment 336 includes a rectangular box-shaped hinge body 340 that rotatably receives a shaft 342. The shaft 342 extends laterally through the hinge body 340 such that ends 344 of the shaft 342 project beyond the hinge body 340. The ends 344 of the shaft 342 are received in hinge receptacles in the display unit 114 and rotate with the display unit 114, while the shaft 342 rotates relative to the hinge body 340.

Optionally, the hinge body 340 may be formed in a monolithic manner with shaft ends 344 that project from opposite ends of the hinge body 340. The ends 344 may rotate within receptacles in the display unit 114. Optionally, the hinge segment 336 may be constructed in numerous alternative manners that support rotational movement between the display unit 114 and the base unit 116.

In the present example, the hinge segment 336 (through the shaft 342) defines and enables the display unit 114 to rotate about a lateral rotational axis 335 that corresponds to the lateral axis 123 (FIG. 1A). Optionally, the hinge segment 336 may define and enable the display unit 114 to rotate about a rotational axis 335 that is oriented at a non-parallel angle to the lateral axis 123.

The guide segment 338 is shaped to fit within the channel structure 300 (FIG. 1A) and has a front cross sectional shape that matches the front cross sectional shape of the channel structure 300 (FIG. 3A). The guide segment 338 includes a guide body 346 comprising, guide legs 350R, 350L, and lateral guide arms 352R, 352L that are all integrally formed as one monolithic piece. The guide legs 350R, 350L are spaced apart from each other and extend vertically downward from the lower end of the guide body 346 (away from the display unit 114). The guide legs 350R, 350L have a bottom side 356 that includes electrical contact pads 364. The guide arms 352R, 352L are located on opposite sides of the guide body 346, and extend laterally in opposite directions. The guide arms 352R, 352L include horizontal top and bottom sides 357, 358 that include electrical contact pads 364. The electrical contact pads 364 are mounted on the guide arms 352R, 352L and guide legs 350L, 350R by any suitable fastening way. For example, the contact pads 364 may be adhesively mounted by a thin adhesive layer or by fasteners. Alternatively, the contact pads 364 may be snapped or pressed into recesses formed in the corresponding bottom sides 356, 358. In another example, the contact pads 364 may be co-extruded with the plastic guide at the corresponding bottom side. The contact pads 364 are formed of conductive materials, such as copper, brass, aluminum or other known conductive materials. The conductive pads strips are electrically insulated from one another through the insulation properties of the guide segment 338. The conductive pads 364 may be round, square or other shapes and sizes as well.

Electrical wires 366 (shown in dashed line) are electrically couple to the contact pads 364 and extend through the interior of the guide segment 338 and hinge body 340 until joining corresponding display mating contacts 365. The display mating contacts 365 are formed on a surface of the hinge body 340. Alternatively, the display mating contacts 365 may be provided in alternative configurations and alternative positions. The display mating contacts 365 or configured to join with corresponding contacts within the display unit 114 to provide an electrical connection between the contact pads 364 and corresponding conductive circuits within the display unit 114.

Alternatively, the electrical wires 366 may extend from the hinge body 340 and continue into the display unit 114 until terminating at a corresponding electrical interface with related electrical components therein. The electrical wires 366 defined corresponding power/data channels that provide power and data to the components of the display unit 114.

Figure 3C:
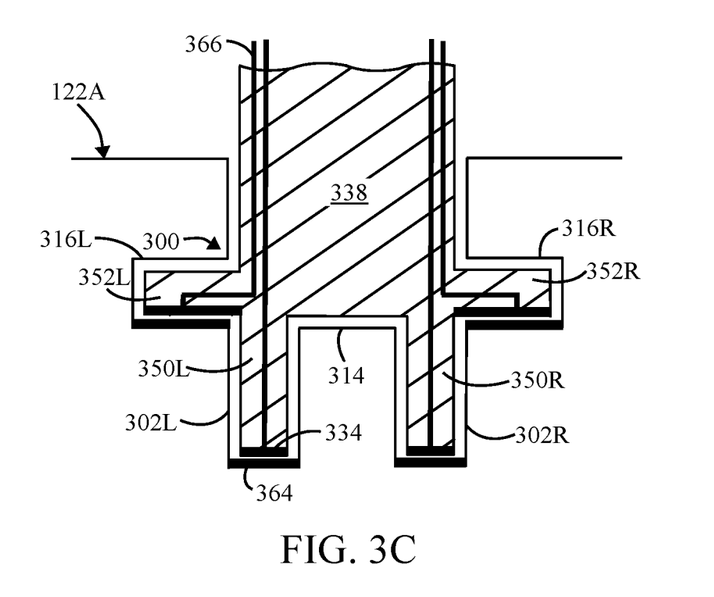
FIG. 3C illustrates a cross-sectional view through the upper cover at the channel structure with a hinge mechanism in position in accordance with an embodiment herein.

FIG. 3C illustrates a cross-sectional view through the upper cover 122A at the channel structure 300 with a hinge mechanism 112 in position in accordance with an embodiment herein. The guide segment 338 slides within the channel structure 300 of the track 124. In particular, the lateral channel arms 316L, 316R receive the corresponding guide arms 352L, 352R, while the channel legs 302L, 302R receive the corresponding guide legs 350L, 350R. The central gap 333 receives the guide body 346. When the guide segment 338 is fit within the channel structure 300, the contact pads 364 electrically engage the corresponding conductive strips 334, thereby creating an electrical connection between the display unit 114 and the base unit 316. The electrical connection is maintained as the guide segment 338 slides along the track 124. The channel arms 316L, 316R will engage the guide arms 352L, 352R to prevent disengagement of the guide segment 338 from the tracks 124 when an upward force is applied to the display unit 114 (and guide segment 338). The channel structure 300 and guide segment 338 enable mating pairs of the contact pads 364 and conductive strips 334 to define individual channels that are electrically isolated from one another. In the present embodiment, the contact pads 364 and conductive strips 334 define four separate power/data channels, although more or fewer power/data channels may be provided. Alternately or in addition, conductive strips may be provided on one or more of the top or side walls of the channel legs and arms and corresponding contact pads may be provided on one or more of the sides of the guide legs and arms facing the conductive strips. The contact pads 364 slide along the conductive strips 334 when the display unit 114 is translationally moved to maintain an electrical connection between the display screen (within the display unit 114) and the display driver (and other electrical components within the base unit 116) over a continuous range of positions of the hinge mechanism 112 along the track 124 and conductive strips 334. For example, regardless of where the hinge mechanism 112 is positioned at any position along the range of the track 112, an electrical connection is maintained and the corresponding power and data channels remain operative. Mating combinations of the contact pads 364 and conductive strips 334 define corresponding power channels and data channels.

Figure 4A:
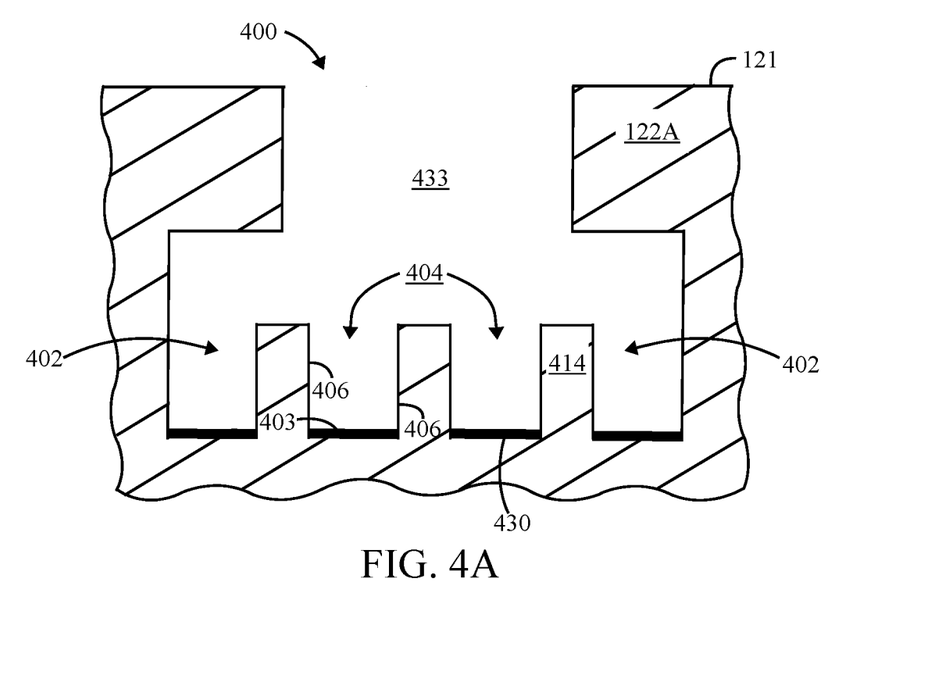
FIG. 4A illustrates an end sectional view taken through a portion of the upper cover proximate to one of the tracks in accordance with embodiments herein.
Figure 4B:
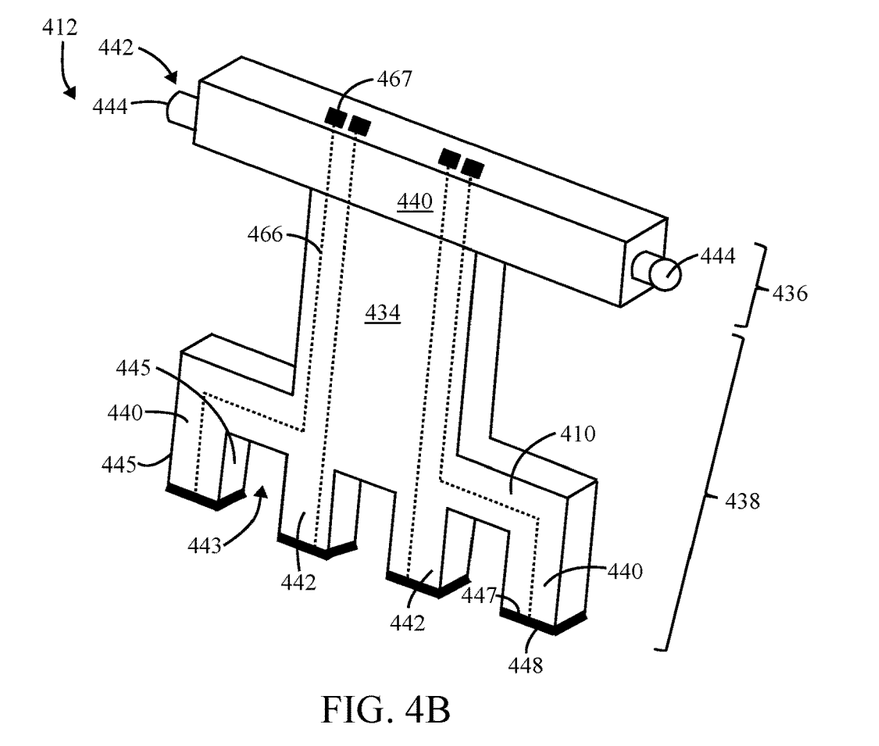
FIG. 4B illustrates a front perspective view of a hinge mechanism formed in accordance with an embodiment herein.
Figure 4C:
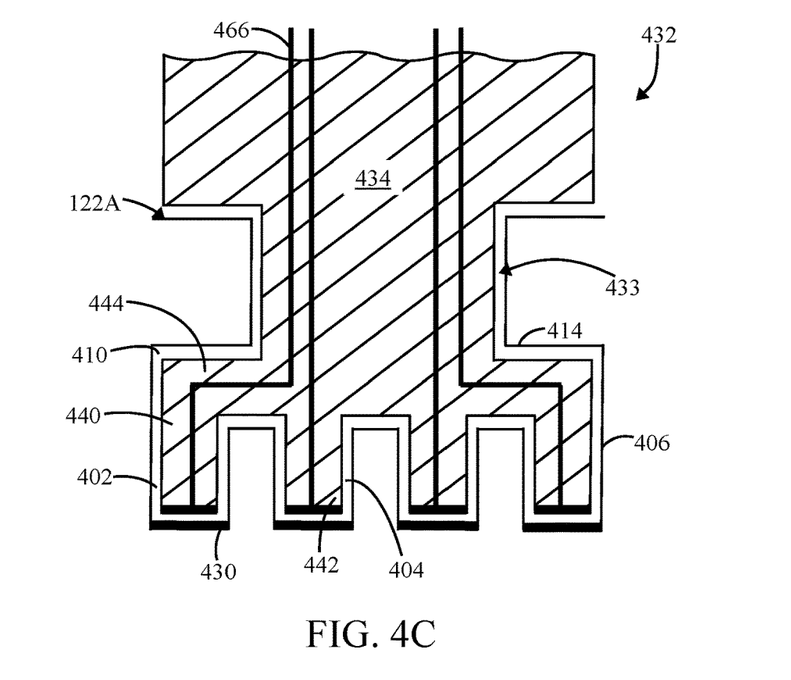
FIG. 4C illustrates a cross-sectional view through the upper cover at the channel structure with the hinge mechanism in position in accordance with an embodiment herein.

FIGS. 4A to 4C illustrate an alternative construction of the channel structure and hinge mechanism in accordance with an embodiment herein.

FIG. 4A illustrates an end sectional view taken through a portion of the upper cover 122A proximate to one of the tracks. The track is formed with (and defines) a channel structure 400 that extends along a length of the track. The channel structure 400 includes a central gap 433 that is formed with multiple channel legs, including outer channel legs 402 and inner channel legs 404. The channel legs 402, 404 are spaced apart from one another by intermediate walls 414. The outer channel legs 402 extend downward from lateral channel arms 410. The channel legs 402, 404 are defined by bottom walls 403 that join opposite vertical side walls 406. Conductive strips 430 are mounted on one or more of the bottom walls 403 and/or side walls 406 of all or a portion of the channel legs, 402, 404 by any suitable fastening way. Each conductive strip 430 general has a width that is similar to or less than the width of the bottom wall 403. The conductive strips 430 are formed in various manners as described herein and may be fastened to the corresponding wall or side through various manners as described herein.

FIG. 4B illustrates a front perspective view of a hinge mechanism 412 formed in accordance with an embodiment herein. The hinge mechanism 412 is shaped and dimensioned to fit within the channel structure 400 (FIG. 4A) and to slide along the corresponding track. The hinge mechanisms 412 includes a hinge segment 436 and a guide segment 438 that may be formed in a monolithic manner with one another, or alternatively as separate pieces that are joined to one another in various manners. The hinge segment 436 includes a rectangular box-shaped hinge body 440 that rotatably receives a shaft 442. The shaft 442 extends laterally through the hinge body 440 such that ends 344 of the shaft 442 project beyond the hinge body 340. The ends 444 of the shaft 442 are received in hinge receptacles in the display unit 114 and rotate with the display unit 114, while the shaft 342 rotates relative to the hinge body 440.

The guide segment 438 has a cross sectional shape that matches the cross sectional shape of the channel structure 400. As illustrated in in FIG. 4B, the guide segment 438 includes a guide body 434 that includes outer and inner guide legs 440, 442 that are all formed in one monolithic piece. The guide legs 440, 442 are spaced apart from each other and separated by gaps 443. The outer guide legs 440 extend downwardly from the outer ends of corresponding arms 444 that extend laterally in opposite directions from the guide body 434. The guide legs 440, 442 have opposite sides 445 and an outer end 447.

Electrical contact pads 448 are mounted on the outer ends 447 of the guide legs 440, 442 by any suitable fastening way. The contact pads 448 are generally sized to cover the corresponding outer ends 447. The contact pads 448 are formed of conductive materials and may be shaped in various configurations as described herein. Electrical wires 466 are electrically couple to the contact pads 448 and extend through the interior of the guide segment 438 and hinge segment 436 until being joined with display mating contacts 467.

FIG. 4C illustrates a cross-sectional view through the upper cover 122A at the channel structure 400 with the hinge mechanism 412 in position in accordance with an embodiment herein. The guide segment 438 slides within the channel structure 400 of the track. In particular, the channel arms 410 receive the corresponding guide arms 444. The outer channel legs 402 receive the outer guide legs 440, and the inner channel legs 404 receive the inner guide legs 442. The central gap 433 receives the guide body 434.

When the guide segment 438 is fit into the channel structure 400, the contact pads 448 electrically engage the corresponding conductive strips 430, thereby creating a desired number electrical connections/channels between the display unit 114 and the base unit 116. This electrical connection is maintained as the guide segment 438 slides along the track 124. The configuration of the channel structure 400 and guide segment 438 enables mating pairs of the contact pads 448 and conductive strips 430 to be electrically isolated from one another. The channel arms 410 engage the guide arms 444 to prevent disengagement of the guide segment 438 from the tracks when an upward force is applied to the guide segment 438. Alternately or in addition, conductive strips 430 may be provided on one or more of the top or side walls of the channel legs and arms and contact pads 448 may be provided on one or more of the sides of the guide legs and arms facing the conductive strips.

Optional elements or features may be added. For example, rollers may be optionally added to the guide or track to facilitate the movement of the guide along the track. Elastic bumpers may be provided on the front and rear walls of the track to cushion the impact of the guide sliding at the front or rear positions. Additionally or alternatively, front and/or rear tracks may be provided that have a U-shaped channel structures and extend longitudinally, in order to interconnect the right and left tracks. Additionally or alternatively, the display unit 114 may be electrically connected to the base unit 116 by a cable that extends from the interior of base unit 116 through a slot formed in the track 124 and then through the hinge mechanism 112. The slot may extend from the front to rear edges of the track to enable the display to slide along the track between the forward and rearward positions while maintaining the electrical connection between the base unit and display unit. Optionally, the hinge mechanisms 112 may be formed from a section of the flexible display layer alone or in combination with other structures. Although the tracks are integrally formed in one piece with the upper cover, alternatively, one or both of the tracks may be a separate piece that is mounted on the upper cover by fasteners, adhesive, or other suitable ways with the channel structure extending through a cut out in the upper cover.

Figure 5:
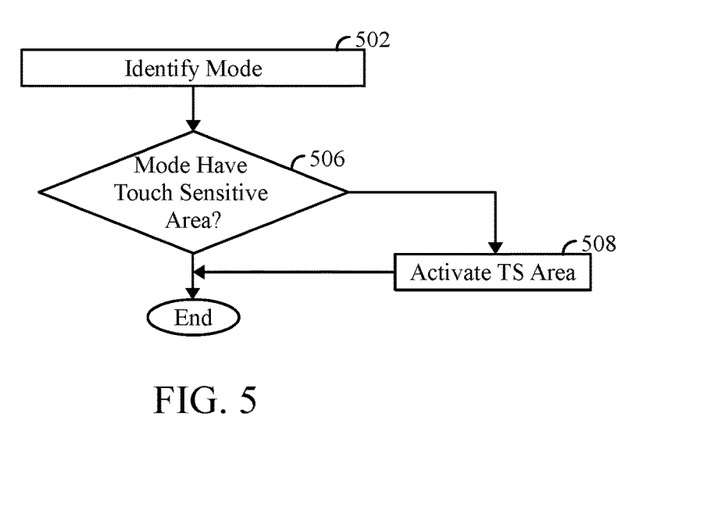
FIG. 5 illustrates a process for configuring a display unit based on an embodiment herein.

FIG. 5 illustrates a process for configuring a display unit based on an embodiment herein. At 502, one or more processors of the device 110 identify the mode of operation based on the position and orientation of the display unit relative to the base unit. Non-limiting examples of modes may include a standard mode, a presentation mode, a tablet mode, a notifications mode and a user query mode. As one example, the device 110 may enter a predetermined initial mode when the device 110 is initially powered up and a user logs in. The device 110 may remain in the initial mode until the device "goes to sleep", powers down, and the like. Optionally, the device 110 may switch modes based on a relative position of the base unit and the display unit. For example, when the display unit is closed onto the keyboard with the display screen exposed and facing outward, the device may automatically switch to a tablet mode. As another example, the presentation mode may correspond to watching video on the device 110. It may be desirable to align the display unit 114 near the front edge or at an intermediate point along the base unit while watching the video. For example, when traveling on an airplane, it may be for convenient to position the display unit 114 at an intermediate point along the base unit 116 while watching movies and other video content.

Optionally, the user may provide an instruction to change the mode, such as to switch to a presentation mode, a tablet mode, and the like. Optionally, the device 110 may remain in a mode throughout operation without change.

At 506, the one or more processors of the device 110 determine whether the identified mode includes a touch sensitive area. For example, the tablet mode and/or the presentation mode may include a touch sensitive area. When the present mode includes a touch sensitive area, flow moves to 508. Otherwise, flow ends. At 508, one or more touch sensitive areas are activated. Additionally or alternatively, the standard mode may include activating a touch sensitive layer. Additionally or alternatively, the standard mode (or any other mode) may include activating a touch sensitive layer within the primary viewing area.

Figure 6:
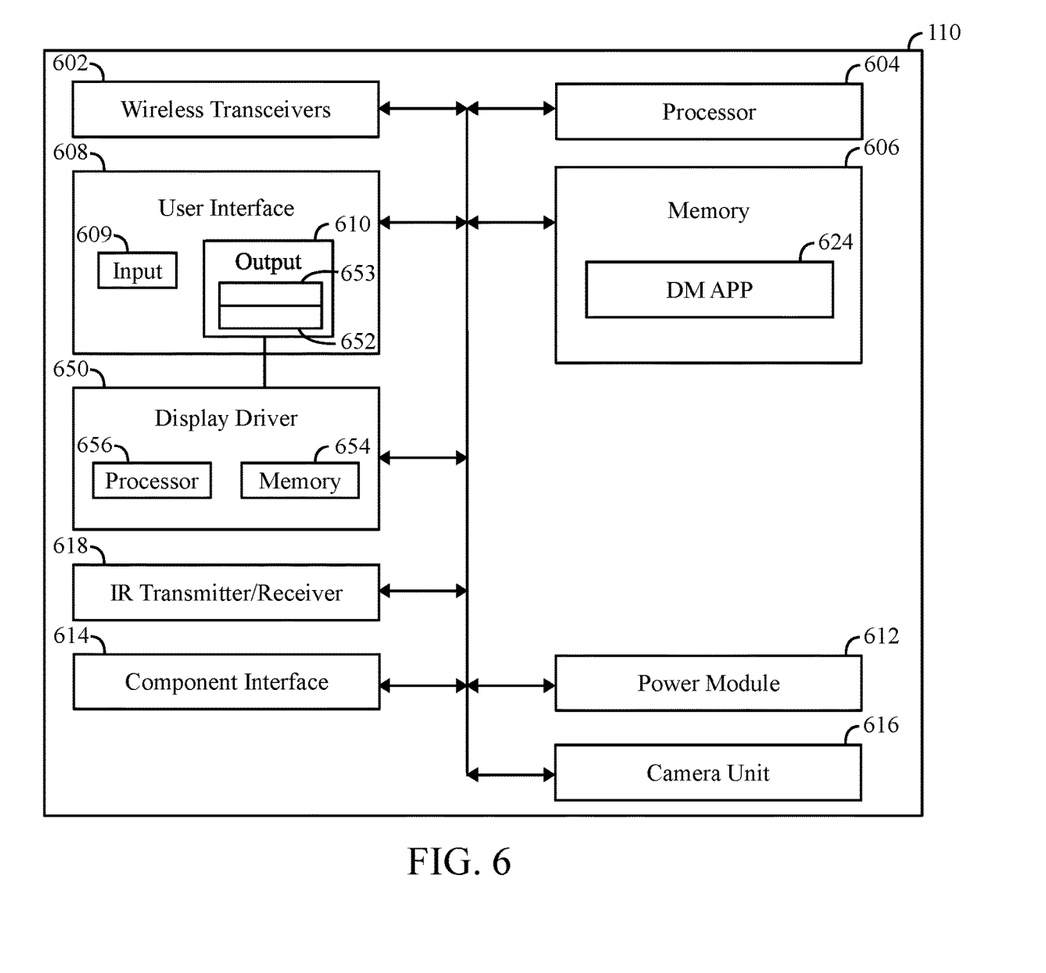
FIG. 6 illustrates a simplified block diagram of internal components of the electronic device configured to manage content display to different regions of a flexible display in accordance with embodiments herein.

FIG. 6 illustrates a simplified block diagram of internal components of the electronic device 110 configured to manage content display to different regions of a flexible display in accordance with embodiments herein. The device 110 includes components such as one or more wireless transceivers 602, one or more processors 604 (e.g., a microprocessor, microcomputer, application-specific integrated circuit, etc.), one or more local storage medium (also referred to as a memory) 606, a user interface 608 which includes one or more input devices 609 and one or more output devices 610, a power module 612, a component interface 614 and a camera unit 616. All of these components can be operatively coupled to one another, and can be in communication with one another, by way of one or more internal communication links, such as an internal bus. The camera unit 616 may capture one or more frames of image data.

The input and output devices 609, 610 may each include a variety of visual, audio, and/or mechanical devices. For example, the input devices 609 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 610 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 610 may include a touch sensitive screen, a non-touch sensitive screen, a text-only display, a smart phone display, an audio output (e.g., a speaker or headphone jack), and/or any combination thereof. Optionally, the input devices 609 may include one or more touch sensitive layers 653 provided on the front and/or rear sides of the display 652.

The transceiver 602 can utilize a known wireless technology for communication. Exemplary operation of the wireless transceivers 602 in conjunction with other components of the device 110, may take a variety of forms and may include, for example, operation in which, upon reception of wireless signals, the components of device 110 detect communication signals from secondary devices and the transceiver 602 demodulates the communication signals to recover incoming information, such as responses to inquiry requests, voice and/or data, transmitted by the wireless signals. The processor 604 formats outgoing information and conveys the outgoing information to one or more of the wireless transceivers 602 for modulation to communication signals. The wireless transceiver(s) 602 convey the modulated signals to a remote device, such as a cell tower or a remote server (not shown).

The local storage medium 606 can encompass one or more memory devices of any of a variety of forms (e.g., read only memory, random access memory, static random access memory, dynamic random access memory, etc.) and can be used by the processor 604 to store and retrieve data. The data that is stored by the memory 606 can include, but need not be limited to, operating systems, applications, user collected content and informational data. Each operating system includes executable code that controls basic functions of the device, such as interaction among the various components, communication with external devices via the wireless transceivers 602 and/or the component interface 614, and storage and retrieval of applications and data to and from the memory 606. Each application includes executable code that utilizes an operating system to provide more specific functionality for the communication devices, such as file system service and handling of protected and unprotected data stored in the local storage medium 606.

A display management (DM) application 624 is stored in the memory 606. The DM application 624 includes program instructions accessible by the one or more processors 604 to direct a processor 604 to implement the methods, processes and operations described herein including, but not limited to the methods, processes and operations illustrated in the FIGS. and described in connection with the FIGS. The DM application 624 manages operation of the processor 604, display driver 650 and/or a video card in connection with displaying desired content.

In accordance with at least one embodiment, a touch sensitive layer is located over the display layer. The DM application 624 directs the processor to switch to a desired mode.

Other applications stored in the memory 606 include various application program interfaces (APIs), some of which provide links to/from the cloud hosting service. The power module 612 preferably includes a power supply, such as a battery, for providing power to the other components while enabling the device 110 to be portable, as well as circuitry providing for the battery to be recharged. The component interface 614 provides a direct connection to other devices, auxiliary components, or accessories for additional or enhanced functionality, and in particular, can include a USB port for linking to a user device with a USB cable.

Optionally, the device 110 may include an infrared (IR) transmitter/receiver 618 that may be utilized in connection with controlling one or more secondary devices through transmission and reception of IR signals.

A display driver 650 is coupled to the processor 604 and configured to manage display of content on a display 652. The display driver 650 is connected to the display screen. The display driver 650 writes the desired content under direction of the main processor 604. Optionally, the display driver 650 includes display memory 654 and one or more display control processors 656. The display memory 654 includes multiple sections, to which the display control processors 656 and/or processor 604 write content to be displayed. The sections of the display memory 654 are mapped to corresponding regions of the display.

Before concluding, it is to be understood that although e.g., a software application for undertaking embodiments herein may be vended with a device such as the system 110, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

The electronic device disclosed allows a user to easily transition from use as a laptop or notebook to a tablet mode by sliding and rotating the display unit without moving the bulk of the electronic unit. The electronic unit also allows the user to select a variety of positions between the front and rear edges of the electronic device to view the display unit.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

This written description uses examples to disclose several embodiments of the subject matter and also to enable a person of ordinary skill in the art to practice the embodiments of the subject matter, including making and using any devices or systems and performing any incorporated methods. The patentable scope of the subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An electronic device comprising:
a display unit;
memory to store program instructions;
a processor to execute the program instructions in connection with operating the electronic device;
a base unit that comprises a track that extends along at least a portion of a top surface of the base unit, the track having a lateral channel arm and a channel leg to form a channel structure therein;
a hinge mechanism connecting the display unit to the base unit, wherein the hinge mechanism includes a lateral guide arm and a guide leg that are shaped to fit within the channel structure and slide along the lateral channel arm and the channel leg, respectively, between forward and rearward positions, the hinge mechanism translationally movable along the base unit over an intermediate range between the forward and rearward positions as the display unit is rotationally movable, through the hinge mechanism, between open and collapsed positions, wherein the hinge mechanism allows translational and rotational movement simultaneously over the intermediate range.

2. The electronic device of claim 1, wherein the lateral channel arm includes a conductive strip that extends along at least a portion of the base unit, the hinge mechanism including a conductive pad to move along the conductive strip within the track to enable the display unit to be electrically connected to the processor during translational movement between the forward and rearward positions.

3. The electronic device of claim 2, wherein the track has a central gap that opens on to the top surface, the hinge mechanism extending through the central gap.

4. The electronic device of claim 1, wherein the channel arm and the channel leg extend along the track.

5. The electronic device of claim 1, further comprising a conductive strip that extends along the base unit, wherein the conductive strip is electrically coupled to a display driver within the base unit, wherein the hinge mechanism includes a contact pad electrically connected to a display screen within the display unit, the contact pad to slide along the conductive strip when the display unit is translationally moved to maintain an electrical connection between the display screen and the display driver over a continuous range of positions of the hinge mechanism along the conductive strip.

6. The electrical device of claim 1, further comprising conductive strips that extend along the track in the base unit and corresponding contact pads provided on the channel arm of the hinge mechanism, the conductive strips and corresponding contact pads defining a power channel and one or more data channels.

7. The electronic device of claim 1, wherein the display unit includes a touch sensitive display, wherein the collapsed position includes a storage position and a tablet position, the touch sensitive display being closed against the base unit corresponding to the storage position, the touch sensitive display being exposed and facing outward from the base unit corresponding to the tablet position.

8. The electronic device of claim 1 wherein the base unit includes a keyboard, the base unit having front and rear edges relative to the keyboard, the display unit being positioned proximate to the rear edge behind the keyboard when the display unit is in the rearward position, the display unit being positioned proximate to the front edge in front of the keyboard when the display unit is in the forward position.

9. An electronic device comprising:
a display unit;
a base unit that includes a track extending along at least a portion of the base unit, the track including forward and rearward positions, the track having a lateral channel arm therein; and
a hinge mechanism provided within the track, the hinge mechanism including a lateral guide arm that fits within and slides along the lateral channel arm;
the hinge mechanism and the display unit to translationally move over an intermediate along the track as the display unit is rotationally movable, through the hinge mechanism, between open and collapsed positions relative to the base unit, wherein the hinge mechanism allows translational and rotational movement simultaneously over the intermediate range;
wherein the track includes a channel structure having a central gap that is formed with a channel leg and the lateral channel arm, the central gap opening onto a top surface of an upper cover of the base unit, the channel leg extending downward from the central gap into a body of the upper cover.

10. The electronic device of claim 9, wherein the base unit includes a keyboard, wherein the display unit includes a touch sensitive display, wherein the display unit is rotatable between a tablet position and a non-tablet position.

11. The electronic device of claim 10, further comprising memory storing program instructions and a processor to execute the program instructions, the processor to activate and deactivate the touch sensitive display relative to the tablet position and the non-tablet position, respectively.

12. The electronic device of claim 11, wherein a rear surface of the display unit covers the keyboard when in the tablet position, and the touch sensitive display of the display unit covers the keyboard when in the non-tablet position.

13. The electronic device of claim 9, wherein the channel structure is formed with multiple channel legs and multiple lateral channel arms, the channel legs extending downward from the central gap into the body of the upper cover.

14. A method comprising:
providing an electronic device with a display unit rotatably mounted to a base unit, the base unit including a keyboard and having front and rear edges relative to the keyboard, wherein the base unit comprises a track that has a lateral channel arm and a channel leg to form a channel structure therein;
rotatably and slidably mounting the display unit to the base unit through a hinge mechanism that includes a lateral guide arm and a guide leg that are shaped to fit within the channel structure- and slide along the lateral channel arm and the channel leg, respectively; and
the hinge mechanism enabling the display unit to move along a longitudinal direction in a linear path over an intermediate range between first and second positions, wherein the linear path at least partially crosses the keyboard, while the display unit is rotatable relative to the base unit, wherein the hinge mechanism allows translational and rotational movement simultaneously over the intermediate range.

15. The method of claim 14, wherein the display unit is rotationally movable, through a hinge mechanism, between open and collapsed positions.

16. The method claim 14, further comprising rotating the display unit open from a storage position, sliding the display unit along the linear path from the first position to the second position, rotating the display unit to a tablet position.

17. The method of claim 14, wherein the first position corresponds to the display unit located proximate to the rear edge of the base unit behind the keyboard, and the second position corresponds to the display unit located proximate to the front edge of the base unit in front of the keyboard.

18. The method of claim 14, wherein the display unit includes a touch sensitive screen, the method further comprising rotating the display unit from the open position to a collapsed position against the base unit such that the touch sensitive screen faces outward from the base unit and is exposed.

19. The method of claim 14, wherein the enabling includes defining the linear path by providing the track along the base unit, the display unit translationally moving along the linear path within the track.

* * * * *